(12) United States Patent
Carlson et al.

(10) Patent No.: US 11,483,974 B2
(45) Date of Patent: Nov. 1, 2022

(54) COTTON HARVESTING MACHINE WITH AUTOMATICALLY VARIABLE DRUM AND SPINDLE SPEED

(71) Applicants: Deere & Company, Moline, IL (US); Iowa State University Research Foundation, Inc., Ames, IA (US)

(72) Inventors: Brandon C. Carlson, Ankeny, IA (US); Charles F. Ostermeier, Slater, IA (US); Nicholas W. Vanlaningham, Bondurant, IA (US); Jeffrey S. Wigdahl, Ames, IA (US); Kurt D. Gustafson, Altoona, IA (US); Jeffrey C. Askey, Boone, IA (US)

(73) Assignees: Deere & Company, Moline, IL (US); IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 347 days.

(21) Appl. No.: 16/516,794

(22) Filed: Jul. 19, 2019

(65) Prior Publication Data

US 2021/0015043 A1 Jan. 21, 2021

(51) Int. Cl.
*A01D 46/08* (2006.01)
*A01D 46/16* (2006.01)
*A01D 41/127* (2006.01)

(52) U.S. Cl.
CPC ....... *A01D 46/085* (2013.01); *A01D 41/1274* (2013.01); *A01D 46/16* (2013.01)

(58) Field of Classification Search
CPC ...... A01D 46/085; A01D 16/16; A01D 46/14; A01D 46/08; A01D 46/12; A01D 46/18; A01D 46/16; A01D 41/127; A01D 41/1271; A01D 41/1274
See application file for complete search history.

(56) References Cited

U.S. PATENT DOCUMENTS

| | | | |
|---|---|---|---|
| 4,578,936 A * | 4/1986 | Aselman, Jr. | A01D 46/085 324/161 |
| 5,048,273 A * | 9/1991 | Orsborn | A01D 46/085 56/10.2 R |
| 5,191,753 A * | 3/1993 | Fachini | A01D 46/08 56/10.9 |
| 5,325,656 A | 7/1994 | Schreiner et al. | |
| 6,863,604 B2 * | 3/2005 | Behnke | A01D 41/127 460/6 |
| 7,386,380 B2 * | 6/2008 | Bares | A01D 46/085 56/10.1 |
| 8,006,472 B1 | 8/2011 | Schreiner et al. | |
| 9,681,605 B2 * | 6/2017 | Noonan | A01D 69/03 |

(Continued)

FOREIGN PATENT DOCUMENTS

CN 108901348 A * 11/2018

*Primary Examiner* — Alicia Torres
*Assistant Examiner* — Madeline I Runco
(74) *Attorney, Agent, or Firm* — Joseph R. Kelly; Kelly, Holt & Christenson, PLLC

(57) ABSTRACT

A sensor input is detected on a cotton harvester. A performance characteristic value is identified based upon the detected sensor input. A speed control system controls cotton harvester drum speed and spindle speed, automatically, and separately from the ground speed of the cotton harvester, to improve the performance characteristic value, in a closed-loop fashion.

20 Claims, 8 Drawing Sheets

(56) References Cited

U.S. PATENT DOCUMENTS

| | | | |
|---|---|---|---|
| 9,894,836 B2* | 2/2018 | Garton | A01D 41/1271 |
| 10,125,848 B2* | 11/2018 | Watt | A01D 69/002 |
| 10,190,662 B2* | 1/2019 | Watt | B60K 25/02 |
| 10,219,436 B2 | 3/2019 | Goering et al. | |
| 10,408,645 B2* | 9/2019 | Blank | A01B 79/005 |
| 10,462,970 B2* | 11/2019 | Noonan | A01D 46/16 |
| 10,462,971 B2* | 11/2019 | Wallestad | A01D 46/14 |
| 10,514,084 B2* | 12/2019 | Watt | A01D 46/08 |
| 10,674,663 B2* | 6/2020 | Kirchbeck | G01N 21/3563 |
| 2010/0217474 A1* | 8/2010 | Baumgarten | A01D 41/127 |
| | | | 701/31.4 |
| 2018/0084725 A1 | 3/2018 | Ostermeier et al. | |
| 2018/0092303 A1 | 4/2018 | Goering et al. | |

* cited by examiner

COTTON HARVESTING MACHINE WITH AUTOMATICALLY VARIABLE DRUM AND SPINDLE SPEED

FIELD OF THE DESCRIPTION

The present description relates to a cotton harvester. More specifically, the present description relates to automatically varying drum and spindle speed on a cotton harvester, separately from ground speed.

BACKGROUND

Some current cotton harvesters have a set of row units on the front end of the harvesters. The row units act to funnel cotton plants, planted in rows, into the individual row units. Each row unit has two columns of spindles, one mounted on either side of the row, as it passes through the row unit. Each set of spindles is driven so that the spindles on one side of the row unit rotate in interdigitated fashion relative to the spindles on the opposite side of the row unit. The spindles are supported for rotation in this way, by a drum. As the drums rotate the spindles, the spindles separate the cotton flowers from the cotton plants. Each of the spindles is elongate along a longitudinal axis. The spindles also rotate about the longitudinal axis. Rotation of the spindles draws the cotton bolls into elongate fibers.

A rotatable doffer rotates in a counter rotating manner, relative to the spindles, to wipe the cotton material from the spindles. The cotton material is then transferred (such as using a vacuum tube or other conveying mechanism) into a containment area. The cotton is transferred from the containment area into a module forming area. Once a module is formed, a door opens at the rearward end of the cotton harvester, so that the module can be ejected, onto the field.

In many current cotton harvesters, the speed of the drum rotation, and the speed of the spindle rotation, is directly and mechanically linked to the forward ground speed of the cotton harvester. This can present a variety of different types of problems. Therefore, a mechanism has been developed so that the drum speed and spindle speed can be varied separately relative to the ground speed of the cotton harvester. One example of this is set out in U.S. Pat. No. 5,325,656.

The discussion above is merely provided for general background information and is not intended to be used as an aid in determining the scope of the claimed subject matter.

SUMMARY

A sensor input is detected on a cotton harvester. A performance characteristic value is identified based upon the detected sensor input. A speed control system controls cotton harvester drum speed and spindle speed, automatically, and separately from the ground speed of the cotton harvester, to improve the performance characteristic value, in a closed-loop fashion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some current systems provide for a variable ratio of drum speed and spindle speed relative to the forward ground speed of the cotton harvester. However, even though the drum and spindle speed may vary separately from the ground speed of the cotton harvester, choosing a drum speed and spindle speed that achieve desired harvesting performance can be very difficult. This is because it can be difficult for an operator to observe how the harvesting performance changes, with changes in the spindle and drum speeds. Similarly, even if this can be observed, the field and crop conditions can change relatively quickly. Therefore, it can be difficult to select a drum speed and spindle speed that maintains harvesting performance at a desired level. It can also be distracting for the operator, and it can be error prone. As just some examples, a cotton harvesting operation can have varying degrees of crop loss, at different drum and spindle speeds, due to weather conditions, cotton variety, cotton maturity, yield (number of bolls per plant), crop conditions (such as moisture), field conditions, among other things.

Therefore, the present description proceeds with respect to a system that provides automatic, closed loop drum and spindle speed control. A harvesting performance characteristic value is generated based on one or more sensor inputs. That value is provided to a dynamic machine learning speed control system which generates drum speed control signals and spindle speed control signals. Those speed control signals are used to control drum and spindle speed and are also fed back to the dynamic machine learning speed control system, along with a current value of the performance characteristic, so that the drum and spindle speed signals can be varied to improve the performance characteristic value.

Figure 1:
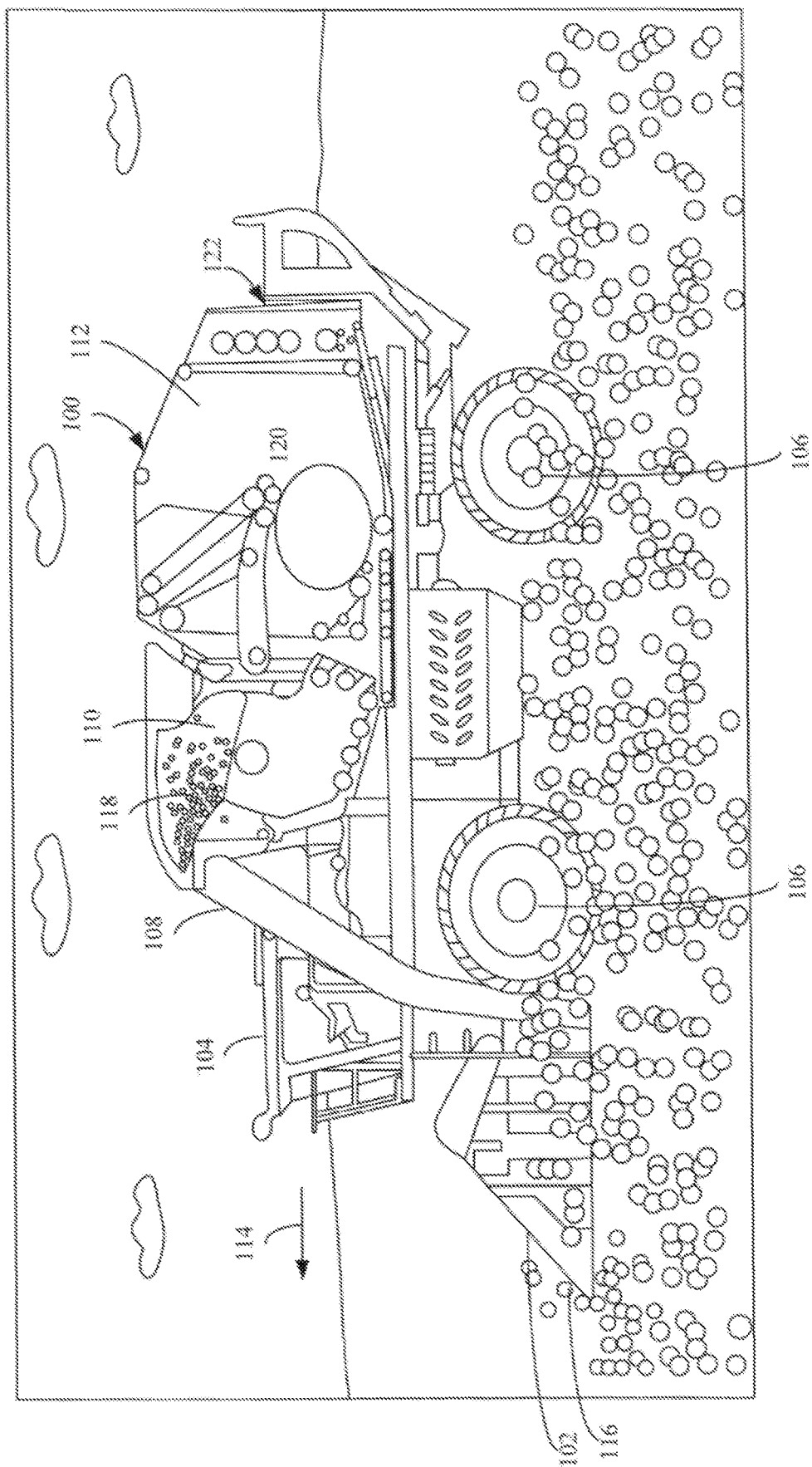
FIG. 1 is a first pictorial illustration of a cotton harvester.

FIG. 1 is a side pictorial view of a cotton harvester 100. FIG. 1 shows that harvester 100 includes a front end 102, an operator's compartment 104, a set of ground engaging elements (such as wheels) 106, a conveyor mechanism 108, a cotton containment area 110 and a module forming area 112. An engine (or other power source) drives movement of harvester 100 in the forward direction indicted by arrow 114. As harvester 100 moves in that direction, the front end (which includes a set of row units 116 extending in the forward direction) engage rows of crop (cotton) and funnel them into the front end portion 102 where the cotton bolls are separated from the cotton plants. The cotton is then lifted by conveyor mechanism 108 (which can be a tube that moves the cotton upwardly under vacuum pressure, or positive air pressure, or it can be another conveyance mechanism). The cotton 118 is then placed in containment area 110 where it builds to a desired level. It is then moved rearwardly toward the module forming portion 112 where it is formed into a module 120. Once the module 120 reaches a desired size, it can be removed from the module forming portion 112 through a rearward portion 122 of harvester 100.

Figure 2:
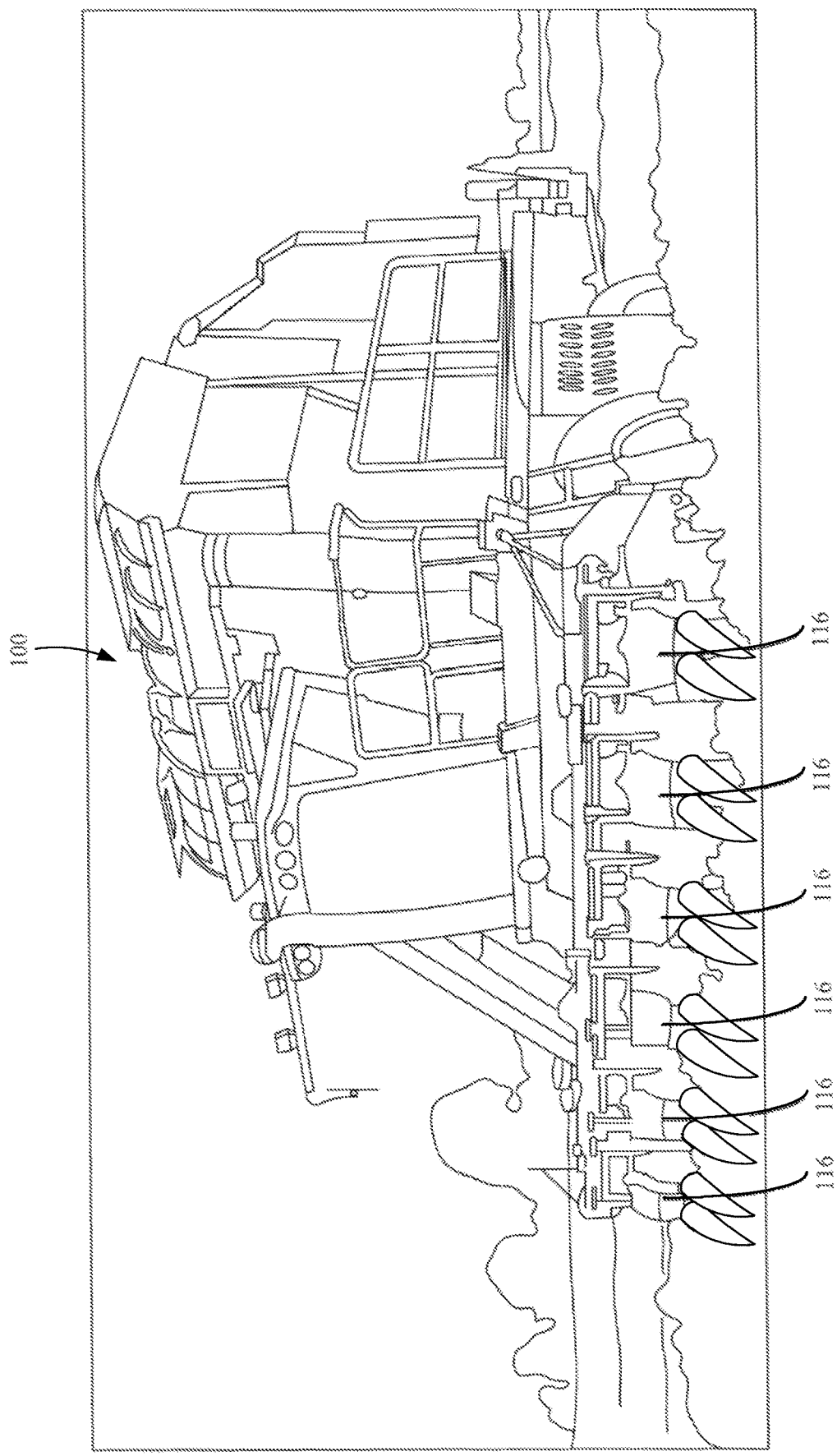
FIG. 2 is a second pictorial illustration of the cotton harvester shown in FIG. 1, and showing row units on a forward part of the harvester, in more detail.

FIG. 2 is another pictorial illustration of the harvester 100 shown in FIG. 1, except it that is taken from a forward portion of harvester 100 so that the row units 116 can be seen more clearly. When the cotton is funneled into harvester 100 through row units 116, the cotton plants encounter the rotatable spindles. The spindles are elongate projections that are rotatably driven by a set of drums. A column of spindles is disposed on either side of the cotton row and the spindles rotate relative to one another in interdigitated fashion to draw the cotton into harvester 100. The spindles also rotate about their elongate axes. Thus, the spindles remove the cotton bolls from the cotton plants. The rotation of the spindles about their elongate axes serve to draw the cotton material into elongate fibers.

Figure 3:
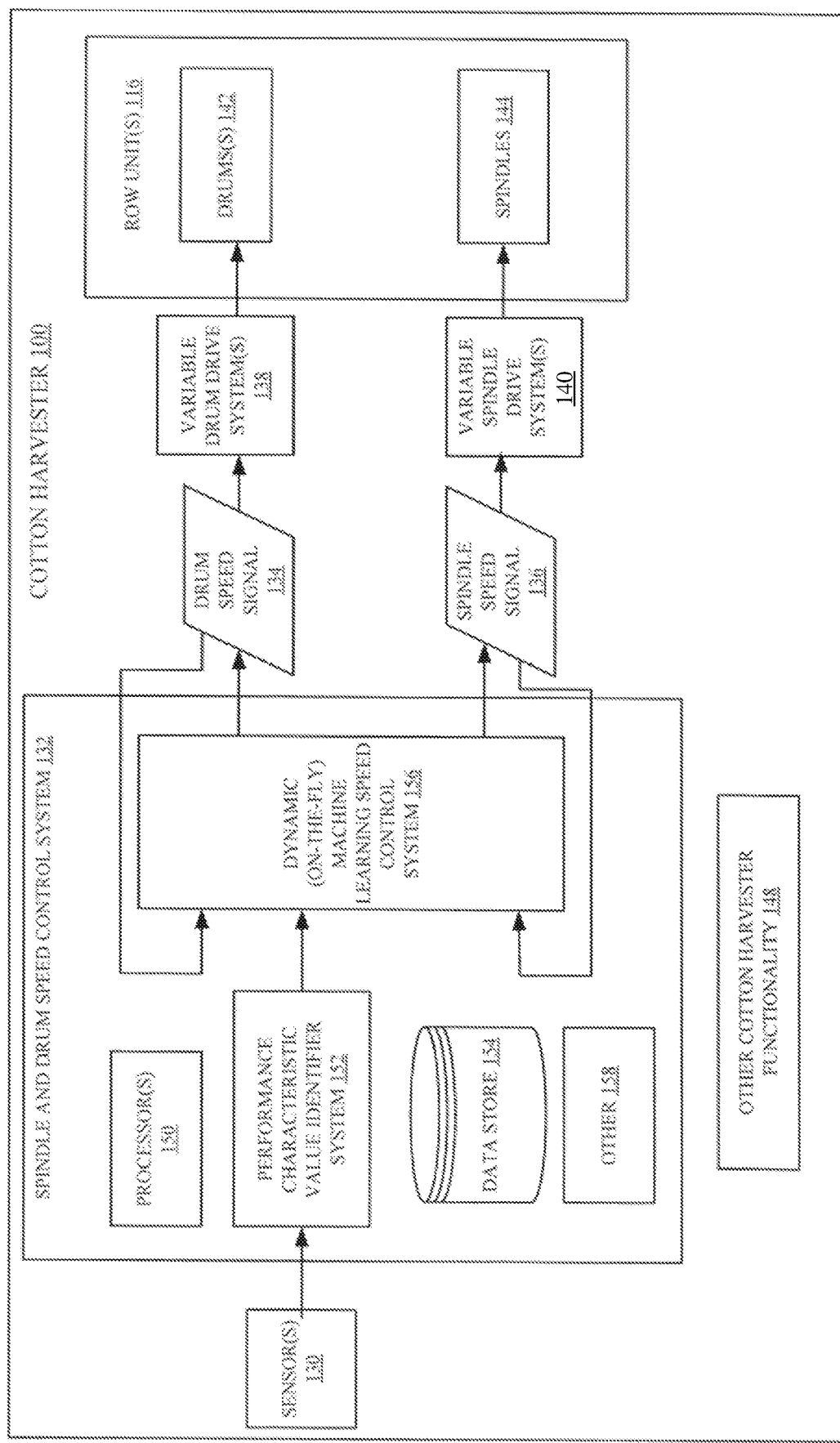
FIG. 3 is a block diagram showing one example of a cotton harvester (such as that shown in FIGS. 1 and 2).

FIG. 3 is a block diagram showing one example of a portion of cotton harvester 100. FIG. 3 shows that one or more sensors 130 can be disposed on harvester 100 and generate sensor signals indicative of sensed variables. For instance, a sensor 130 may be a mass flow sensor that senses the mass flow of cotton through a particular row unit, or through harvester 100. The sensors can be a wide variety of other sensors as well, and some of those are described below with respect to FIG. 4.

The sensor signal is provided to a spindle and drum speed control system 132 which generates a drum speed signal 134 and a spindle speed signal 136. Those signals are provided to variable drum drive system 138 and variable spindle drive system 140, respectively. The variable drive systems 138 and 140 provide outputs that drive rotation of the drums 142 and spindles 144 on one or more row units 116. The variable drum and spindle drive systems can be variable speed motors, gear boxes with automatically shiftable gears that are driven by a transmission from the harvester engine, or other drive systems.

In one example, there may be different variable drum drive systems 138 and variable spindle drive systems 140 for the different row units 116 on harvester 100. Thus, the drums on the different row units can be driven at different speeds, as can the spindles. In that way, the performance of each individual row unit can be optimized or otherwise improved separately from the other row units. In another example, there is one variable drum drive system 138 and one variable spindle drive system 140. Thus, system 138 drives the drums 142 on all row units 116 at the same rate, and system 140 drives rotation of all spindles 144 on all row units 116 at the same rate as well.

Cotton harvester 100 will, of course, have a wide variety of other cotton harvester functionality as well. This is indicated by block 148 in the block diagram of FIG. 3.

FIG. 3 also shows that, in one example, spindle and drum speed control system 132 can include one or more processors 150, performance characteristic value identifier system 152, data store 154, dynamic (on-the-fly) machine learning speed control system 156, and it can include other items 158.

Performance characteristics value identifier system 152 receives the sensor signals from sensors 130 and identifies a performance characteristic value that speed control system 132 uses for automatically controlling the drum speed and spindle speed. That value is fed into dynamic (on-the-fly) machine learning speed control system 156 which determines, based upon the current speed control signals and the performance characteristic value, whether the speed signals should be changed (so that the drum speed is increased or decreased, and/or so that the spindle speed is increased or decreased). If so, system 156 generates one or more new speed control signals 134 and 136 and provides them to the variable drive systems 138 and 140, respectively. It thus changes the speed of one or more drums 142 and/or spindles 144. System 156 then also receives a new performance characteristic value from system 152 and determines whether the change in speed improved the performance of cotton harvester 100 (as measured by the performance characteristic value).

As just one example, assume the performance characteristic being monitored is mass flow rate of cotton through the row units (which can be measured in kilograms per second or kilograms per meter of row traveled by machine 100). Then, dynamic machine learning speed control system 156 receives the mass flow value from system 152, along with the current speed control signals 134 and 136. It determines whether to change one of more of the speed control signals in an attempt to improve the mass flow value. It can do this based on a machine learned control algorithm that has values, or relationships, that have been learned during the operation of harvester 100 in the current field (or in neighboring fields). If speed control system 156 does change one or more of the speed signals 134 and 136, then it determines whether the performance characteristic value improved or got worse, or stayed the same. It uses that result to perform additional learning and to thus modify the machine learned control algorithm, and also to generate the speed control signals 134 and 146.

In another example, performance characteristic value identifier system 152 may identify the values of a plurality of different performance characteristics. The machine learning control algorithm used by dynamic machine learning speed control system 156 may be used to optimize (or improve) harvester operation as measured by those plurality of characteristics. This type of multi-input feed back control can be used to improve the overall operation of cotton harvester 100, by controlling the speed of drums 142 and 144, on-the-fly, to optimize (or improve) the multiple performance characteristics.

Figure 4A:
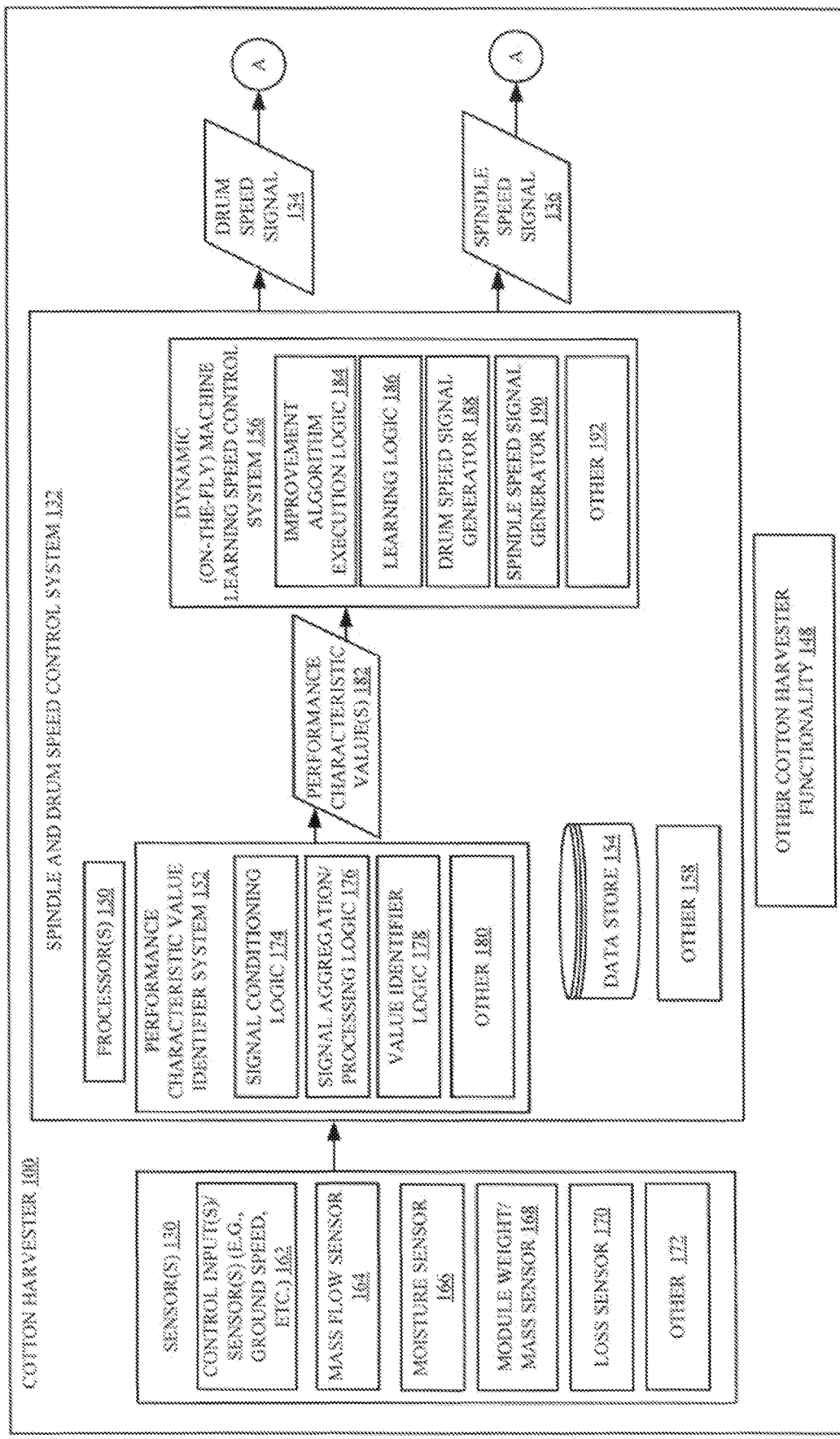
FIGS. 4A and 4B (collectively referred to herein as FIG. 4) show a block diagram showing a cotton harvester illustrated in FIG. 3, in more detail.
Figure 4B:
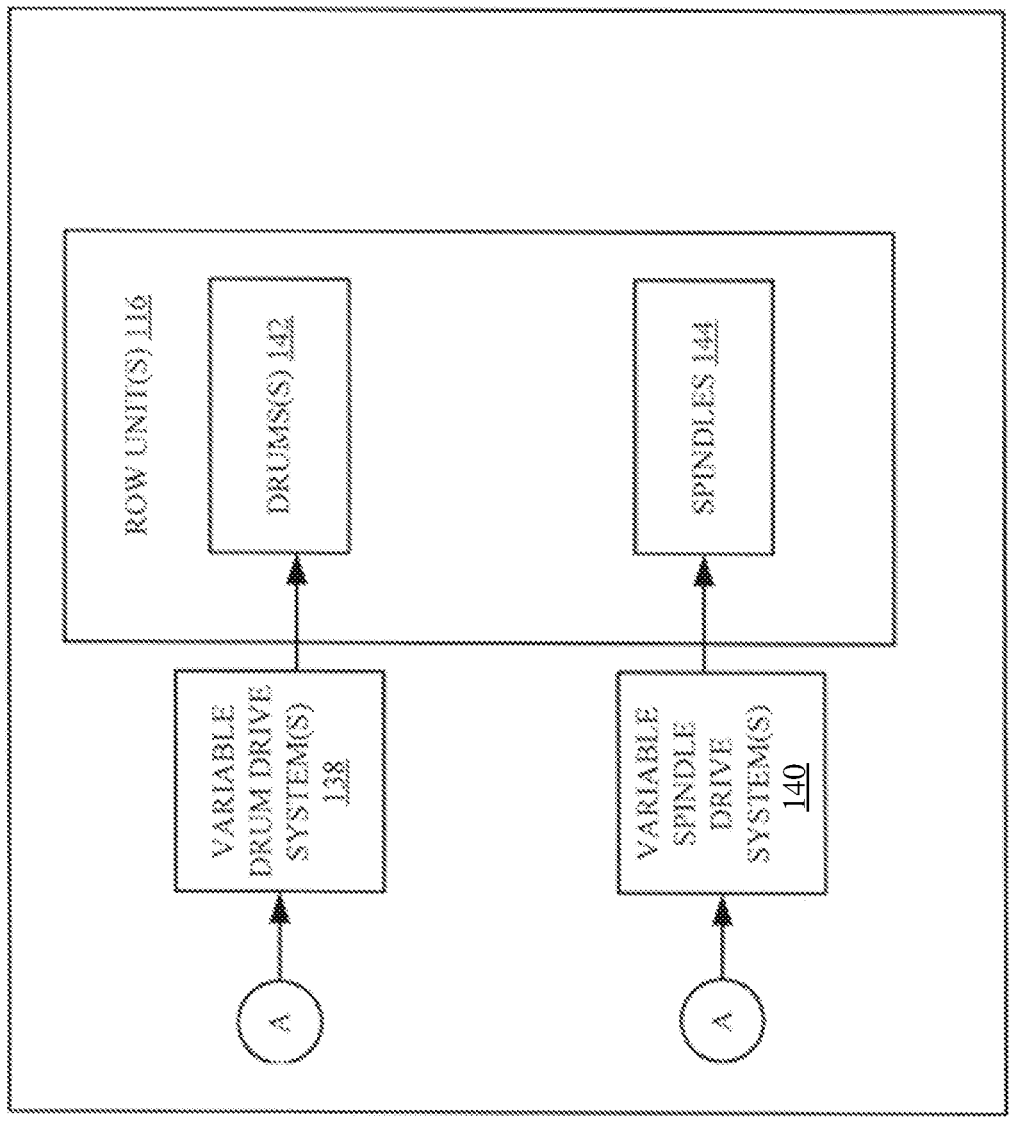

FIGS. 4A and 4B (collectively referred to herein as FIG. 4) show a block diagram showing one example of cotton harvester 100, with some items that are similar to those shown in FIG. 3 (and they are similarly numbered). However, FIG. 4 shows a number of items in more detail.

FIG. 4 shows that, in one example, sensors 130 can be control inputs or sensors that sense the value of control inputs, as indicated by block 162. For instance, a ground speed sensor can sense the value of the ground speed control input, or it can sense the actual ground speed of harvester 100 and provide a sensor signal indicative of that. This is just one example of a control signal that can be sensed.

Sensors 130 can include a mass flow sensor 164. The mass flow sensor may be an optical sensor or another sensor that senses the mass flow of cotton through each individual row units, or through the conveyor, or another portion of harvester 100.

Sensors 130 can include a moisture sensor 166. The moisture sensor may generate a sensor value based upon the dimensions of the cotton module 120 generated by harvester 100, and based on its weight. The moisture sensor 166 can generate a sensor signal in other ways as well.

Sensors 130 can include module weight/mass sensor 168. Sensor 168 can be a sensor that is disposed on harvester 100 to sense the weight of a module, as it is being transported by harvester 100, as it is exiting harvester 100, etc.

The sensors 130 can include a loss sensor 170 that senses crop loss. In one example, loss sensor 170 may be an optical sensor (such as a camera or other image sensor) that senses an amount of crop still on the plants, after harvester 100 has passed. It can generate a loss signal indicative of an estimated crop loss value.

Sensors 130 can include a wide variety of other sensors as well. This is indicated by block 172.

The sensor signals are received by performance characteristic value identifier system 152. It can include signal conditioning logic 174, signal aggregation/processing logic 176, value identifier logic 178, and a wide variety of other items 180. Signal conditioning logic 174 can provide signal conditioning, such as amplification, normalization, linearization, filtering, etc. Signal aggregation/processing logic 176 can aggregate or otherwise process signals so that various derived performance characteristic values can be obtained. For instance, it may be that signal values are aggregated and averaged over time, or processed relative to other values in order to obtain the desired performance characteristic. Based on the conditioned and possibly aggregated or otherwise processed sensor signals, value identifier logic 178 generates the value for the one or more performance characteristics being used to control drum and spindle speed. System 152 then outputs the one more performance characteristic values 182 to dynamic machine learning speed control system 156.

Data store 154 can store a machine learned model or machine learning algorithm that can be used as the control (or improvement) algorithm it can reside elsewhere as well.

System 156 can include improvement algorithm execution logic 184, learning logic 186, drum speed signal generator 188, spindle speed signal generator 190, and it can include other items 192. Improvement algorithm execution logic 184 executes the optimization or improvement algorithm that can be used to determine whether a speed change is needed for either drums 142 or spindles 144. Learning logic 186 can perform continuous machine learning to improve the control algorithm. Drum speed signal generator 188 generates the drum speed signal 134 that is applied to the variable drum drive system 138. Spindle speed signal generator 190 generates the spindle speed signal 136 that is applied to the variable spindle drive system 140. Speed signals 134 and 136 are also fed back to system 156, so that they are used in a closed loop fashion.

Figure 5A:
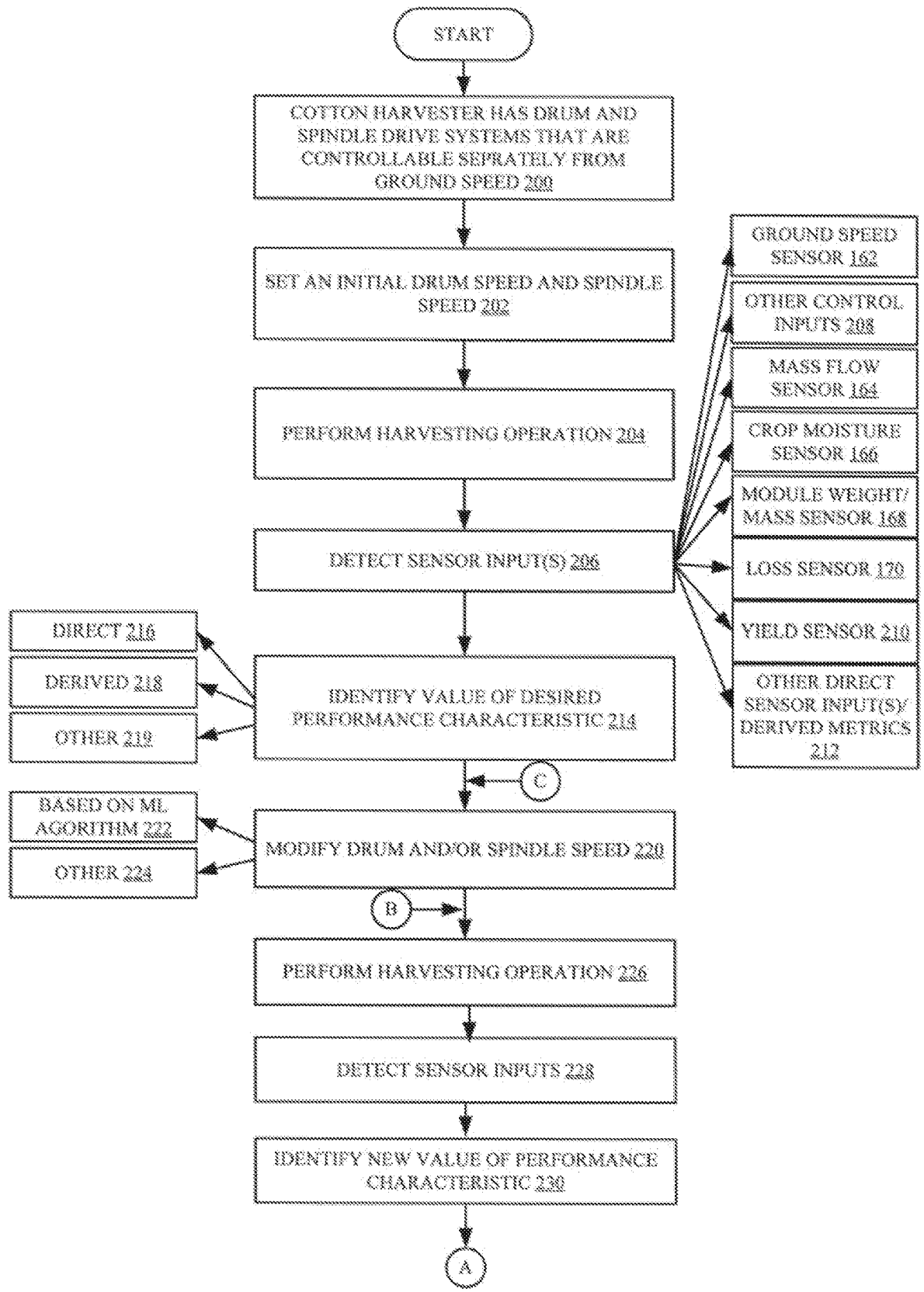
FIGS. 5A and 5B (collectively referred to herein as FIG. 5) show a flow diagram illustrating one example of the operation of a spindle and drum speed control system.
Figure 5B:
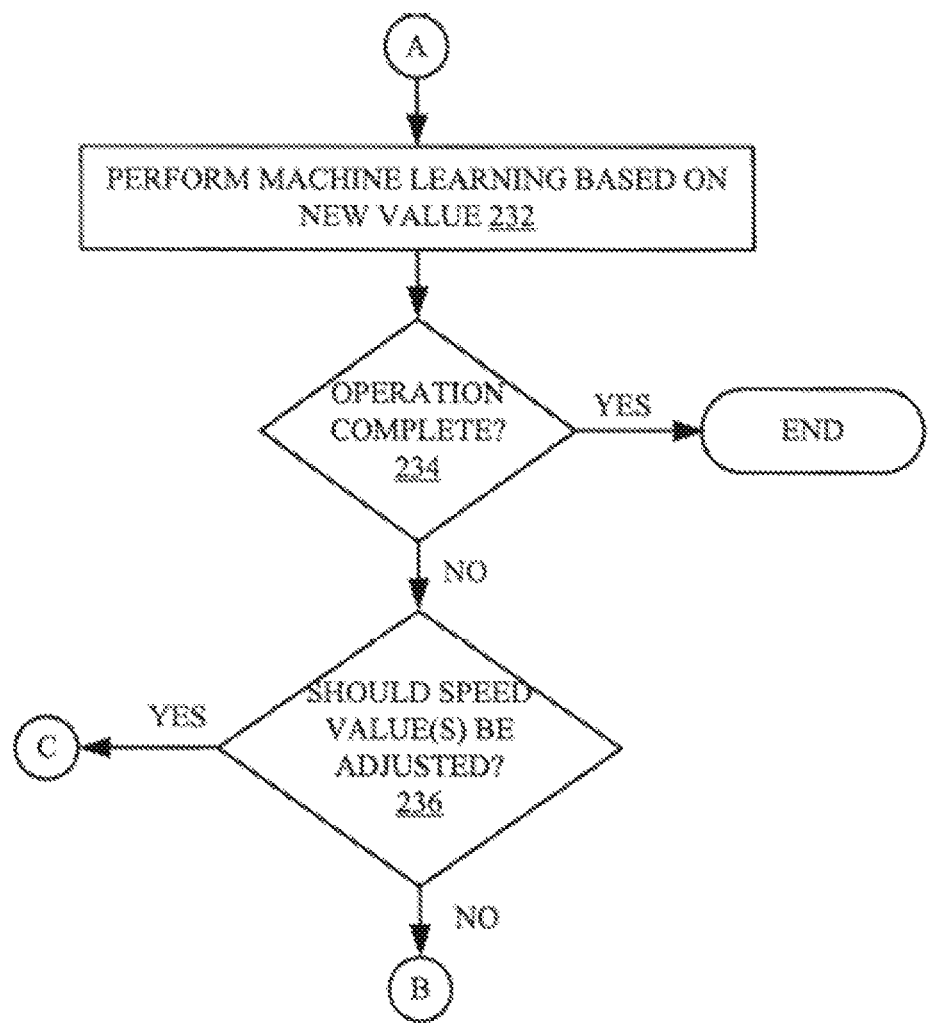

FIGS. 5A and 5B (collectively referred to herein as FIG. 5) describe a flow diagram illustrating the operation of cotton harvester 100 in controlling spindle and drum speed separately from harvester ground speed. It is first assumed that cotton harvester 100 has drum and spindle drive systems that are controllable separately from one another and from the ground speed of harvester 100. This is indicated by block 200 in the flow diagram of FIG. 5. Dynamic on-the-fly machine learning speed control system 156 sets an initial drum speed and spindle speed. In doing so, it generates drum and spindle speed signals 134 and 136 and provides them to drives 138 and 140 so the drums and spindles are rotating at the desired speed. Setting an initial drum speed and spindle speed is indicated by block 202 in the flow diagram of FIG. 5.

An operator controls cotton harvester 100 to begin performing initial harvesting operation. Harvester 100 can harvest for a certain amount of time, for a certain amount of distance, it can harvest a certain amount of cotton, etc. Performing an initial harvesting operation is indicated by block 204.

Performance characteristic value identifier system 152 then senses the inputs from sensors 130. This is indicated by block 206. As mentioned above, the sensors can be a ground speed sensor 162, other control inputs 208, a mass flow sensor 164, a crop moisture sensor 166, a module weight/mass sensor 168, a loss sensor 170, any of a wide variety of other sensors from which yield can be obtained, as indicated by block 210, or other direct sensor inputs or derived metrics, as indicated by block 212. Performance characteristic value identifier system 152 then identifies the value of a desired performance characteristic. This is indicated by block 214 in the flow diagram of FIG. 5. It can be a direct sensor input as indicated by block 216, or it can be a derived value based on an aggregated or otherwise processed signal (aggregated or processed by logic 176) and identified by identifier logic 178. Identifying a derived value is indicated by block 218 in the flow of FIG. 5.

It is then assumed that improvement algorithm execution logic 184 executes an improvement algorithm based upon the initial speed signals 134 and 146 and based upon the performance characteristic value 182. This is indicated by block 220 in the flow diagram of FIG. 5. It can be based on a machine learning algorithm that was stored in data store 154, as indicated by block 222, or it can be based on another algorithm as indicated by block 224.

Again, harvester 100 performs a harvesting operation. This is indicated by block 226. It can harvest for a desired distance, a desired time, it can harvest a desired amount of cotton, etc.

Performance characteristic value identifier system 152 then continues to detect the sensor inputs from one or more of sensors 130. This is indicated by block 228. System 152 also identifies a new value of the performance characteristic that is being used to control the drum and spindle speeds. Identifying the new value of the performance characteristics is indicated by block 230 in the flow diagram of FIG. 5.

Learning logic 186 can perform machine learning to update the machine learned algorithm executed by logic 184. It can do this based upon the new inputs (e.g., the new performance characteristic value 182 and the adjusted speed signals 134 and 136). Performing machine learning based upon the new values is indicated by block 232 in the flow diagram of FIG. 5.

As long as the operation is not complete, as indicated by block 234, then improvement algorithm execution logic 184 can determine whether either or both of the speed signals 134 and 136 need to be changed, based upon the optimization (or improvement) algorithm. If so, it indicates the direction and magnitude of change to drum speed signal generator 188 and/or spindle speed signal generator 190. Generator 188 generates the drum speed signal 134 at the new level. It is provided to drum drive system 138 to change the speed of rotation of drum 142. Similarly, when the spindle speed is to be changed, spindle speed signal generator 190 generates spindle speed signal 136 based upon the magnitude and direction of change provided by improvement algorithm execution logic 184. That signal is provided to variable spindle drive system 140 which changes the speed of rotation of spindles 144. Thus, at block 236 in the flow diagram of FIG. 5, if any speed is to be changed based upon the output of improvement algorithm execution logic 184, then processing reverts to block 220 where the drum and/or spindle speed is modified. However, if logic 184 generates an output indicating that neither the drum nor spindle speed need to be changed, then processing reverts to block 226 where harvester 100 again continues to perform the harvesting operating.

It can thus be seen that the present system performs closed loop control of the drum and spindle speed to optimize one or more different performance characteristics. It can also improve harvester operation in other ways. For instance, it may be that the current spindle speed is maintaining the performance characteristic at a desired level, but it may be able to be decreased without the performance characteristic value changing in a significant way (such as by a threshold amount). In that case, system 156 generates an output to reduce the spindle speed, while still maintaining the performance characteristic value at a desired level. This reduces the wear on the spindle, the spindle drive train, the variable speed drive system 140, etc. The same can be done with respect to drum 142. Thus, dynamic machine learning speed control system 156 can optimize or improve machine performance as measured by a number of different metrics (such as yield or efficiency, mass flow rate, as well as machine wear, etc.) at the same time.

It will also be noted that multiple cotton harvesters may be operating in one field. In that case, the drive and spindle speeds of the various harvesters can be shared among them and used to learn and adjust speeds on any given harvester.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIGS. 2 and 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
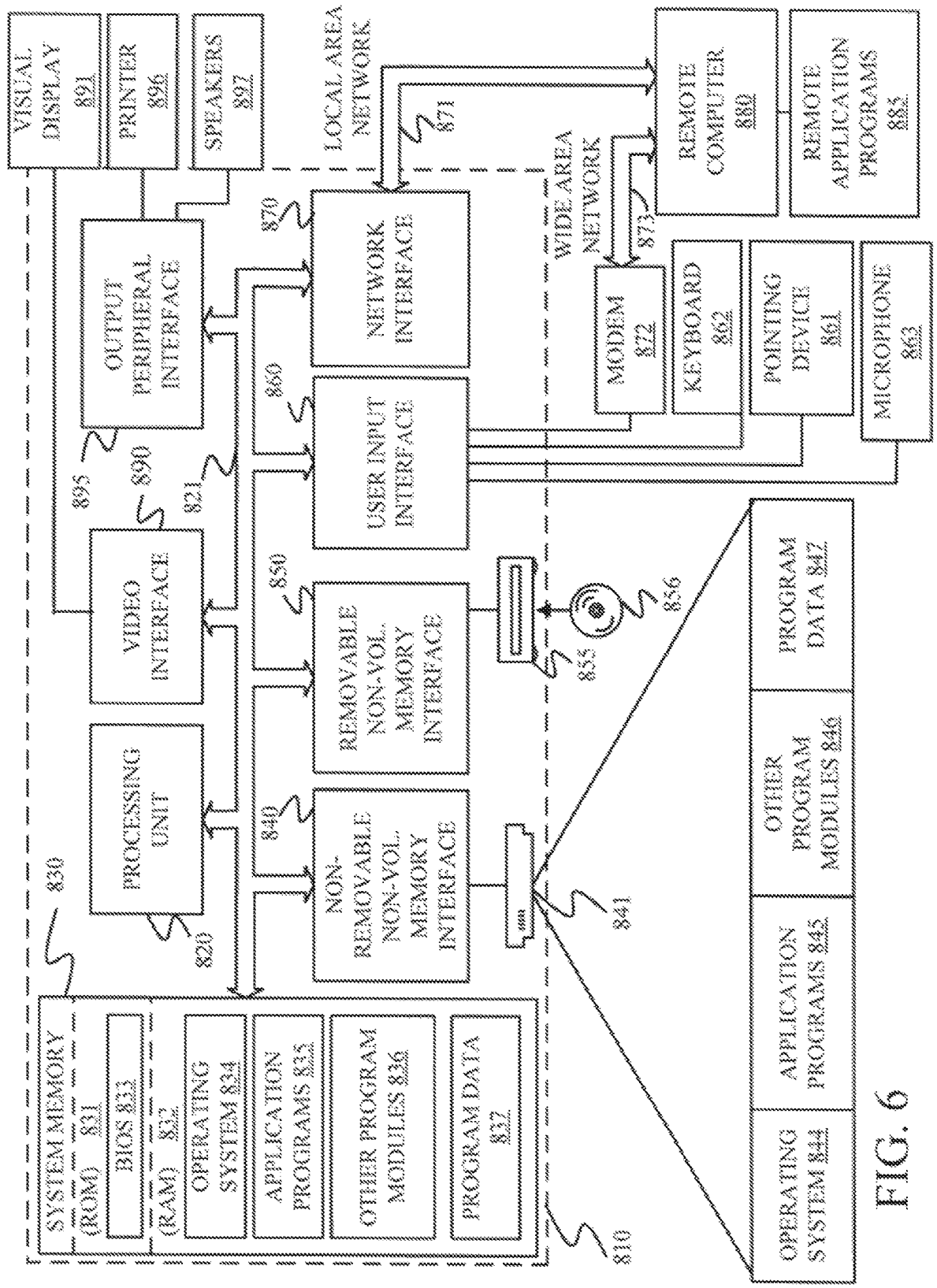
FIG. 6 is a block diagram showing one example of a computing environment that can be used in the cotton harvesters illustrated in previous Figures.

FIG. 6 is one embodiment of a computing environment in which elements of FIG. 1, or parts of it, (for example) can be deployed. With reference to FIG. 6, an exemplary system for implementing some embodiments includes a general-purpose computing device in the form of a computer 810. Components of computer 810 may include, but are not limited to, a processing unit 820 (which can comprise processor 150), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically, connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a cotton harvester, comprising:
a frame;
ground engaging elements driven by a power source at a drive speed;
a sensor sensing a sensed variable and generating a sensor signal indicative of the sensed variable;
a variable drum drive system;
a variable spindle drive system;
a drum that is rotatable relative to the frame and that is rotatably driven by the drum drive system;
a first spindle mounted to a spindle support structure, rotation of the drum driving rotation of the spindle support structure, the spindle having a corresponding longitudinal axis and being rotatable about the longitudinal axis, the spindle drive system driving rotation of the spindle about the corresponding longitudinal axis; and
a speed control system that automatically generates a drum speed signal, based on the sensor signal, and that automatically generates a spindle speed signal based on the sensor signal, the variable drum drive system driving rotation of the drum at a speed based on the drum speed signal, and the variable speed spindle drive system driving rotation of the spindle at a speed based on the spindle speed signal.

Example 2 is the cotton harvester of any or all previous examples wherein the speed control system automatically generates the drum speed signal and the spindle speed signal independently of the drive speed.

Example 3 is the cotton harvester of any or all previous examples wherein the speed control system comprises:
a performance characteristic value identifier system configured to receive the sensor signal and identify a performance characteristic value of a performance characteristic based on the sensor signal; and
a dynamic speed control system that automatically varies the drum speed signal and the spindle speed signal based on changes in the performance characteristic value.

Example 4 is the cotton harvester of any or all previous examples wherein a current value of the drum speed signal and a current value of the spindle speed signal are fed back into the dynamic speed control system so the dynamic speed control system varies the drum speed signal and the spindle speed signal based on the performance characteristic value and the current value of the drum speed signal and the current value of the spindle speed signal.

Example 5 is the cotton harvester of any or all previous examples wherein the dynamic speed control system varies the drum speed signal and the spindle speed signal during operation of the cotton harvester in performing a harvesting operation.

Example 6 is the cotton harvester of any or all previous examples wherein the dynamic speed control system comprises:
improvement algorithm execution logic configured to execute an improvement algorithm to identify a new value for the drum speed signal based on the current value of the drum speed signal and the performance characteristic value, and to identify a new value for the spindle speed signal based on the current value of the spindle speed signal and the performance characteristic value.

Example 7 is the cotton harvester of any or all previous examples wherein the dynamic speed control system comprises:
a drum speed signal generator configured to generate the drum speed signal based on the new value for the drum speed signal; and
a spindle speed signal generator configured to generate the spindle speed signal based on the new value for the drum speed signal.

Example 8 is the cotton harvester of any or all previous examples wherein the sensor comprises:
a mass flow sensor that senses a mass flow of cotton through a portion of the cotton harvester and generates the sensor signal as a mass flow signal indicative of the sensed mass flow.

Example 9 is the cotton harvester of any or all previous examples wherein the sensor comprises:
a loss sensor that senses a crop loss variable indicative of crop loss and generates the sensor signal as a loss signal indicative of the sensed crop loss variable.

Example 10 is the cotton harvester of any or all previous examples wherein the sensor comprises:
a moisture sensor that senses crop moisture and generates the sensor signal as a moisture signal indicative of the sensed crop moisture.

Example 11 is the cotton harvester of any or all previous examples and further comprising a module forming mechanism that forms a cotton module, wherein the sensor comprises:
a module weight/mass sensor that senses module weight or mass and generates the sensor signal as a weight/mass signal indicative of the sensed module weight or mass.

Example 12 is a control system on a cotton harvester that travels at a controllable ground speed and that has a rotatable drum that supports spindles, the control system comprising:
a sensor sensing a sensed variable and generating a sensor signal indicative of the sensed variable; and
a speed control system that automatically generates a drum speed signal, based on the sensor signal, and provides the drum speed signal to a variable drum drive system driving rotation of the drum at a speed based on the drum speed signal.

Example 13 is the control system of any or all previous examples wherein the speed control system automatically generates the drum speed signal and the spindle speed signal independently of the ground speed.

Example 14 is the control system of any or all previous examples wherein the speed control system automatically generates a spindle speed signal, based on the sensor signal, and provides the spindle speed signal to a variable spindle drive system driving rotation of the rotatable spindles at a speed based on the spindle speed signal.

Example 15 is the control system of any or all previous examples wherein the speed control system comprises:

a performance characteristic value identifier system configured to receive the sensor signal and identify a performance characteristic value of a performance characteristic based on the sensor signal; and a dynamic speed control system that automatically varies the drum speed signal and the spindle speed signal based on changes in the performance characteristic value.

Example 16 is the control system of any or all previous examples wherein a current value of the drum speed signal and a current value of the spindle speed signal are fed back into the dynamic speed control system, the dynamic speed control system varying the drum speed signal and the spindle speed signal based on the performance characteristic value and the current value of the drum speed signal and the current value of the spindle speed signal.

Example 17 is the control system of any or all previous examples wherein the dynamic speed control system varies the drum speed signal and the spindle speed signal during operation of the cotton harvester in performing a harvesting operation.

Example 18 is the control system of any or all previous examples wherein the dynamic speed control system comprises:

improvement algorithm execution logic configured to execute an improvement algorithm to identify a new value for the drum speed signal based on the current value of the drum speed signal and the performance characteristic value, and to identify a new value for the spindle speed signal based on the current value of the spindle speed signal and the performance characteristic value.

Example 19 is a control system on a cotton harvester that travels at a controllable ground speed and that has a rotatable drum that supports rotatable spindles, the control system comprising:

a sensor sensing a sensed variable and generating a sensor signal indicative of the sensed variable; and a speed control system that automatically generates a spindle speed signal, based on the sensor signal, and provides the spindle speed signal to a variable spindle drive system driving rotation of the rotatable spindles at a speed based on the spindle speed signal.

Example 20 is the control system of any or all previous examples wherein the speed control system that automatically generates a drum speed signal, based on the sensor signal, and provides the drum speed signal to a variable drum drive system driving rotation of the drum at a speed based on the drum speed signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A cotton harvester, comprising:
   a frame;
   ground engaging elements driven by a power source at a drive speed;
   a sensor sensing a sensed variable and generating a sensor signal indicative of the sensed variable;
   a variable drum drive system;
   a variable spindle drive system;
   a drum that is rotatable relative to the frame and that is rotatably driven by the variable drum drive system;
   a first spindle mounted to a spindle support structure, rotation of the drum driving rotation of the spindle support structure, the spindle having a corresponding longitudinal axis and being rotatable about the longitudinal axis, the variable spindle drive system driving rotation of the spindle about the corresponding longitudinal axis; and
   a speed control system that:
      identifies a current drum speed;
      automatically generates a drum speed signal, based on the sensor signal and the current drum speed, the variable drum drive system driving rotation of the drum at a speed based on the drum speed signal;
      identifies a current spindle speed; and
      automatically generates a spindle speed signal based on the sensor signal and the current spindle speed, the variable spindle drive system driving rotation of the spindle at a speed based on the spindle speed signal.

2. The cotton harvester of claim 1 wherein the speed control system automatically generates the drum speed signal and the spindle speed signal independently of the drive speed.

3. The cotton harvester of claim 1 wherein the speed control system comprises:
   a performance characteristic value identifier system configured to receive the sensor signal and identify a performance characteristic value of a performance characteristic based on the sensor signal; and
   a dynamic speed control system that automatically varies the drum speed signal and the spindle speed signal based on changes in the performance characteristic value.

4. The cotton harvester of claim 3 wherein the dynamic speed control system comprises:
   improvement algorithm execution logic configured to execute an improvement algorithm to identify a new value for the drum speed signal based on the current value of the drum speed signal and the performance characteristic value, and to identify a new value for the spindle speed signal based on the current value of the spindle speed signal and the performance characteristic value.

5. The cotton harvester of claim 4 wherein the dynamic speed control system comprises:
   a drum speed signal generator configured to generate the drum speed signal based on the new value for the drum speed signal; and
   a spindle speed signal generator configured to generate the spindle speed signal based on the new value for the drum speed signal.

6. The cotton harvester of claim 1 wherein the sensor comprises:
   a mass flow sensor that senses a mass flow of cotton through a portion of the cotton harvester and generates a mass flow signal indicative of the sensed mass flow.

7. The cotton harvester of claim 1 and wherein the sensor comprises:
   a loss sensor that senses a crop loss variable indicative of crop loss and generates a loss signal indicative of the sensed crop loss variable.

8. The cotton harvester of claim 1 wherein the sensor comprises:
   a moisture sensor that senses crop moisture and generates a moisture signal indicative of the sensed crop moisture.

9. A control system on a cotton harvester that travels at a controllable ground speed and that has a rotatable drum that supports spindles that extend radially from the drum along a respective longitudinal axis, the control system comprising:
   a first sensor sensing a first characteristic and generating a first sensor signal indicative of the first characteristic;
   a second sensor sensing a second characteristic, different than the first characteristic, and generating a second sensor signal indicative of the second characteristic; and
   a speed control system that:
      automatically generates a drum speed signal, based on the first sensor signal and the second sensor signal; and
      provides the drum speed signal to a variable drum drive system driving rotation of the drum at a speed based on the drum speed signal.

10. The control system of claim 9 wherein the speed control system automatically generates a spindle speed signal, based on the first sensor signal and the second sensor signal, and provides the spindle speed signal to a variable spindle drive system driving rotation of the rotatable spindles about their respective longitudinal axis at a speed based on the spindle speed signal.

11. The control system of claim 10 wherein the speed control system automatically generates the drum speed signal and the spindle speed signal independently of the ground speed.

12. The control system of claim 11 wherein the speed control system comprises:
   a performance characteristic value identifier system configured to receive the first sensor and the second sensor signal and identify a performance characteristic value of a performance characteristic based on the first sensor signal and the second sensor signal; and
   a dynamic speed control system that automatically varies the drum speed signal and the spindle speed signal based on changes in the performance characteristic value.

13. The control system of claim 12 wherein a current value of the drum speed signal and a current value of the spindle speed signal are fed back into the dynamic speed control system, the dynamic speed control system varying the drum speed signal and the spindle speed signal based on the performance characteristic value and the current value of the drum speed signal and the current value of the spindle speed signal.

14. The control system of claim 13 wherein the dynamic speed control system varies the drum speed signal and the spindle speed signal during operation of the cotton harvester in performing a harvesting operation.

15. The control system of claim 14 wherein the dynamic speed control system comprises:
   improvement algorithm execution logic configured to execute an improvement algorithm to identify a new value for the drum speed signal based on the current value of the drum speed signal and the performance characteristic value, and to identify a new value for the spindle speed signal based on the current value of the spindle speed signal and the performance characteristic value.

16. A control system on a cotton harvester that travels at a controllable ground speed and that has a rotatable drum that supports rotatable spindles that each rotate about a respective longitudinal axis, the control system comprising:
   a sensor sensing a sensed variable and generating a sensor signal indicative of the sensed variable; and
   a speed control system that:
      determines whether to increase or decrease a speed of the rotatable spindles based on the sensor signal and a current speed of the rotatable spindles; and
      generates a spindle speed signal, based on the determination; and
      provides the spindle speed signal to a variable spindle drive system driving rotation of the rotatable spindles about their respective longitudinal axis at a speed based on the spindle speed signal.

17. The control system of claim 16 wherein the speed control system further:
   determines whether to increase or decrease a speed of the rotatable drum based on the sensor signal and a current speed of the rotatable drum; and
   generates a drum speed signal, based on the determination; and
   provides the drum speed signal to a variable drum drive system driving rotation of the drum at a speed based on the drum speed signal and separate from the rotation of the rotatable spindles as commanded b the spindle speed signal.

18. The cotton harvester of claim 1 wherein the sensor comprises a plurality of sensors, the plurality of sensors comprising:
   a mass low sensor that senses a mass flow of cotton through a portion of the cotton harvester and generates a mass flow signal indicative of the sensed mass flow;
   a loss sensor that senses a crop loss variable indicative of crop loss and generates a loss signal indicative of the sensed crop loss variable;
   a module weight/mass sensor that senses a weight or mass of a cotton module generated by the cotton harvester and generates the sensor signal as a weight/mass signal indicative of the sensed weight or mass of the cotton module;
   a moisture sensor that senses crop moisture and generates a moisture signal indicative of the sensed crop moisture; and
   wherein the speed control system automatically generates the drum speed signal based on the current drum speed and the mass flow signal, the loss signal, the weight/mass signal, and the moisture signal and automatically venerates the spindle speed signal based on the current spindle speed and the mass flow signal, the loss signal, the weight/mass signal, and the moisture signal.

19. The cotton harvester of claim 1 and further comprising a module forming mechanism that forms a cotton module and wherein the sensor comprises:
   a module weight/mass sensor that senses a module weight or mass and generates the sensor signal as a weight/mass signal indicative of the sensed module weight or mass.

20. The control system of claim 9 wherein the first sensor senses, as the first characteristic, one of a mass flow of cotton through a portion of the cotton harvester, a crop loss variable indicative of crop loss, a weight/mass of a cotton module generated by the cotton harvester, or a crop moisture, and wherein the second sensor senses, as the second characteristic, a different one of the mass flow of cotton through the portion of the cotton harvester, the crop loss variable indicative of crop loss, the weight/mass of the cotton module generated by the cotton harvester, or the crop moisture.

* * * * *